(No Model.)
A. S. DIMMICK.
FRUIT CRATE.
No. 585,158. Patented June 22, 1897.
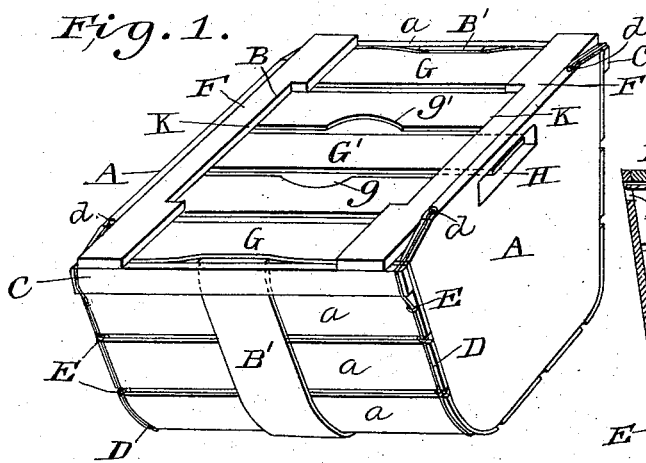
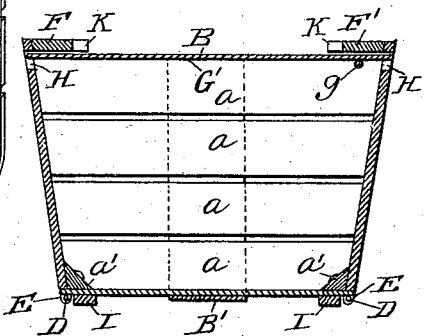
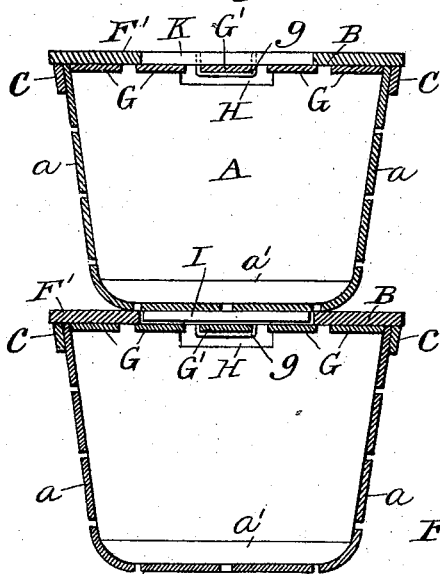
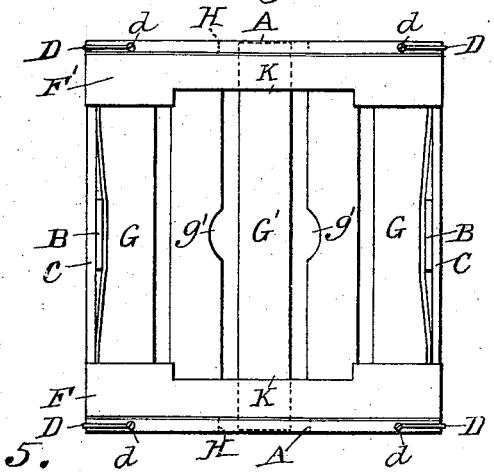
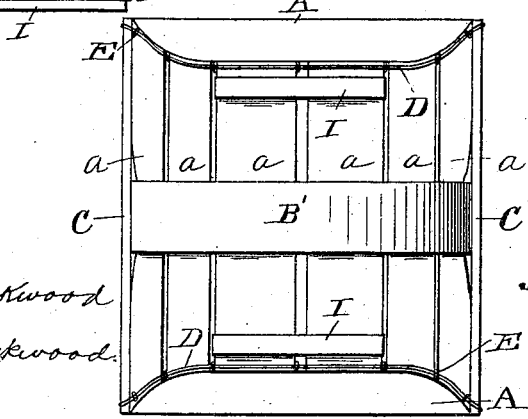
Witnesses
Jas. H. Blackwood
Albert B. Blackwood
Inventor
Alvin S. Dimmick
by D. A. Gourich
Attorney

UNITED STATES PATENT OFFICE.

ALVIN S. DIMMICK, OF BELDING, MICHIGAN.

FRUIT-CRATE.

SPECIFICATION forming part of Letters Patent No. 585,158, dated June 22, 1897.

Application filed November 3, 1896. Serial No. 610,979. (No model.)

*To all whom it may concern:*

Be it known that I, ALVIN S. DIMMICK, a citizen of the United States, residing at Belding, in the county of Ionia and State of Michigan, have invented certain new and useful Improvements in Fruit-Crates, of which the following is a specification.

My invention relates to fruit baskets or boxes, and has for one of its objects to provide a fruit basket or box in which fruit may be packed for handling, storage, or for shipping without injury or damage.

Another object of my invention is to provide a basket or box which may be stored or shipped along with similar baskets in a compact manner and when shipped with fruit therein may be placed in tiers one upon another without crushing the fruit.

Another object of my invention is to provide a basket or box which is light of weight and of great strength.

Still another object of my invention is to provide a fruit-basket which may be cheaply manufactured without the aid of expensive machinery.

I accomplish the objects of my invention in the manner and by the means hereinafter fully described in detail, reference being made to the accompanying drawings, forming part of this specification, in which the same letters of reference indicate like parts in all the figures of the drawings.

Figure 1 is a perspective view of one of my improved fruit-baskets. Fig. 2 is a central section of one of my improved baskets. Fig. 3 is a section of two baskets one on top of the other. Fig. 4 is a top plan view. Fig. 5 is a bottom plan view.

In carrying out my invention I construct my improved fruit-basket preferably of wood, the parts being secured with nails, staples, and wires, the shape of the basket being slightly oblong and flaring from the bottom at the sides and ends. Both top and bottom are flat, the sides at the bottom being rounded. Each of the ends A A is formed of a single board or two or more boards securely joined at their edges; but where the size of the basket will permit I prefer to form them of a single piece. The end pieces A A are cut straight on their upper edge and converge at their ends slightly from top to near their lower edges and have their lower corners circular in outline. Their upper and lower edges are parallel to each other. To the sides and bottom of the edges of the end pieces are secured, by means of nails, the slats $a$. The slats $a$ may be of hard wood and sawed, split, or cut and of the thickness of veneer or of double veneer. They do not extend to the top of the end pieces A A, the lid B when in place resting flush with the top edges thereof.

Transverse reinforcing-strips $a'$ $a'$, triangular in cross-section, are placed at each end of the interior of the basket, at the bottom thereof, and are nailed to the ends A A. Extending around the outer side of the basket, midway of the ends thereof, is a reinforcing-strip B', secured to the slats $a$ by small flat-headed tacks or nails driven outward from the interior of the basket and having their outer ends clenched.

Reinforcing-strips C C extend on each side of the basket along the upper edge and are nailed to the end pieces and to the ends of the reinforcing-strip B' and to the top slats. A wire D extends around the slatted part of the ends of the basket, the wire having each of its ends $d$ $d$ secured to the top edge of the end pieces by means of nails. The wire D is further secured around the slatted ends by small staples E. These staples E may be driven through the slats $a$ or between the open joints. The lid of the basket consists of cross-bars F F', which extend across the top of the basket, at each end thereof, with their ends resting on the edges of the strips C, to which are secured slats G at each of their ends by means of nails, except the middle slat G', each end of which projects beyond the cross-bars F F' and is nailed to the cross-bar F', the opposite end being held in movable contact with the under side of cross-bar F by a loop $g$, each end of which is driven through the bar and clenched therewith. Each end of the basket has a slot H H cut therein to receive the projecting ends of the slat G'. The lid is secured in place by inserting the projecting nailed end of the slat G' in one of the slots, placing the opposite end of the slat G on the edge of the end piece A, above the slot H therein, and then pressing the cross-bar F down, at the same time grasping the slat G' at the middle thereof and pulling it upward and bending it, thereby drawing back the projecting end of the slat which passes through the loop g until it will allow the lid to fall into position. The slat G' then being released, the projecting end enters the slot. To permit the slat G' to be grasped by the thumb and fingers, the slats on each side of it adjacent thereto have semicircular recesses g' cut in their edges. To remove the lid, the slat G' is pulled upward at the middle, the cross-bar over the movable end of the slat is held down by placing the thumb on the cross-bar over the looped end of the slat and the fingers against the end of the basket, and the projecting end of the slat drawn out of the slot.

The bottom of the basket has transverse bars I I, securely attached on the outside thereof near each of the ends and parallel therewith. The inner edges of each of the cross-bars F F' are provided with recesses K K to a depth and length to correspond with the size of the transverse bars I I, attached to the bottom of the basket. When it is desired to set one basket on top of another or a number of baskets in tiers, the transverse bars I I rest in the recesses K K and prevent the basket placed on another from slipping either sidewise or endwise. When it is desired to expose the fruit by removing the lid, the latter may be used as a platform to set the basket upon. The lid at the same time being out of the way is less apt to be lost.

The portions of my improved basket on which the weight of the fruit packed therein is borne are free from sharp angles, such as would cut or cause the fruit to be bruised by reason of the limited surface thereof upon which the fruit would rest. This is a material advantage over such baskets as have rectangular bottoms or square corners at either sides or ends. Its construction admits of lightness of weight with great strength, the latter being of great importance when placing one basket on top of another and a number of such baskets one above another in either storing or shipping.

The construction of the lid permits the basket and its contents to be lifted by grasping the middle of the locking-slat, a means that presents no obstruction such as is usual when bails and projecting side lifts are provided. If desired, the slots H H may be slightly enlarged to form handholds when the basket is large or the contents heavy. I do not wish it understood that use of my improved basket is to be confined to fruits alone, it being obvious that it may be used for any purpose in which a basket or packing crate or box is used.

Having thus described my invention, what I claim as new, and desire to secure by Letters Patent, is—

1. A basket having its sides and bottom formed of slats secured to solid end pieces and a reinforcing-strip secured around and to the outside of said slats midway of the ends thereof, a reinforcing-bar secured lengthwise to the upper edges of the basket on the outside thereof and at each end to the end pieces of said basket, a removable lid consisting of a series of slats, all of said slats except one secured at each of their ends to transverse bars, the other slat of the series secured at one of its ends to one of said transverse bars with its end projecting therefrom, its opposite end supported by a loop to the other of said bars with its end projecting therefrom, slots in each of said end pieces to receive said projecting ends of said slat when said slat is shortened by the bending thereof, substantially as shown and described.

2. A basket provided with a removable lid formed of a series of slats, all of said slats but one secured at each of their ends to transverse bars, the ends of said bars projecting beyond said slats and supported on the edges of the sides of said basket, a slat of the series forming said lid rigidly secured near one of its ends to one of said bars and its end projecting beyond said bar, the opposite end of said slat movably supported by a loop secured to the transverse bar at the end of said slat with its end projecting beyond said bar and the end pieces of said basket provided with slots to receive the projecting ends of said slat when said slat is shortened by bending it, substantially as shown and described.

3. A basket formed of slats secured at their ends to the end pieces of said basket, transverse parallel bars secured to the outside of the bottom of said basket, said basket provided with a lid formed of slats secured at their ends to transverse bars having projecting ends resting on a longitudinal bar secured on each side of said basket to the upper edge thereof and to said end pieces, said transverse top bars recessed on their inner edges to a depth and length corresponding to the size of the transverse bars on the bottom of said basket, to receive the transverse bars on the bottom of a like basket when placed thereon, and said lid provided with means for interlocking with the end pieces of said basket, substantially as shown and described.

4. A basket formed of slats secured at their ends to the end pieces of said basket, said basket converging slightly at its ends and sides from the top to the bottom thereof and its sides circular in cross-section at their lower edges, transverse parallel bars secured to the outside of said bottom near the ends thereof, said basket provided with a flat lid formed of slats secured at their ends to the under side of transverse bars having projecting ends resting on the edges of said basket at the ends thereof, said transverse bars of said lid recessed on their inner edges to a depth and length corresponding to the size of the transverse bottom bars to receive the transverse bars on the bottom of a like basket when placed thereon, substantially as shown and described.

In testimony whereof I hereto affix my signature in the presence of two witnesses.

ALVIN S. DIMMICK.

Witnesses:
  GEO. S. ROSEVELT,
  WM. SMITH.